Oct. 29, 1935.   R. GULOTTA   2,019,345
OPHTHALMIC MOUNTING
Filed June 17, 1932
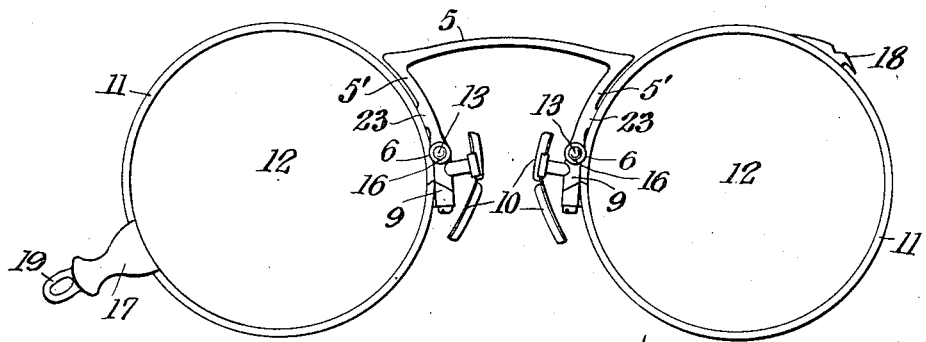
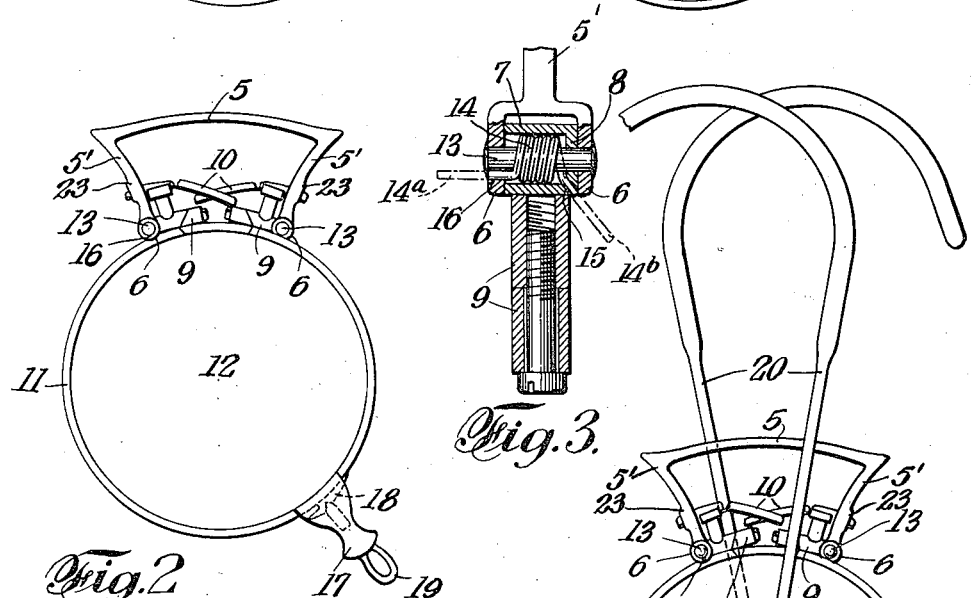
INVENTOR
Rosolino Gulotta
BY
Percy Freeman
ATTORNEY Patented Oct. 29, 1935

2,019,345

UNITED STATES PATENT OFFICE 2,019,345

OPHTHALMIC MOUNTING

Rosolino Gulotta, Bronx, N. Y.

Application June 17, 1932, Serial No. 617,715

1 Claim. (Cl. 88—44)

This invention relates to eye glasses and more specifically to the type known as oxford or folding glasses.

Hitherto oxford glasses were provided with a long flexible connecting member between the two frames to permit folding, which entailed superposing one lens over the other. A snap catch was provided to retain the glasses in this position and it is quite apparent that continued usage would change the original flexibility of the connecting member and therefore ruin the nicety to which the lenses were set. The nose pieces wouldn't have the nose gripping power originally intended and, all in all, such an arrangement required continual adjustment and care.

It is therefore the major object of this invention to provide a mounting for oxford glasses having a type of bow or bridge usually used for non-folding glasses but with means for pivotally mounting the lens frames with resilient members in the pivots so that the lenses may be superposed without flexing or straining the bridge.

Further objects and advantages of the invention will appear from the following disclosure thereof, together with the attached drawing which illustrates preferred embodiments thereof, and in which:

Fig. 1 is a front view of an open pair of oxford glasses showing a preferred embodiment of the invention.

Fig. 2 is a similar view showing the glasses in a closed or folded position.

Fig. 3 is an enlarged sectional view through one of the hinge mounts.

Fig. 4 is a closed face view of the invention as applied to spectacles.

In greater detail there is shown in the drawing at 5 a conventional type of bow or spectacle bridge substantially rigid yet flexible enough so the glasses may be readily applied to and pinch the bridge of the nose. The side legs 5' of the bridge are formed with forked ends 6, each engageable over a hinge tube 7 formed with one closed end 8. Each tube is secured, as by solder, to one member of a frame clamp 9 and each clamp may support a nose gripper 10.

Each two-part clamp is rigidly secured and adjacent to the open ends of a lens frame 11 bearing a lens 12.

The forked ends 6 of the side legs are provided with holes as are also the closed ends 8 of the hinge tubes for hinge pintles 13 headed over after assembly as shown. Each hinge pintle has strung over it a torsional spring 14 having one end projecting into an aperture 15 of the hinge tube and the other anchored in an aperture 16 of one of the members of the forked ends.

When assembling a spring hinge as above described the spring end 14a may be inserted into the aperture 16 of one of the fork members, and after the required tension is stored in the spring 14 by revoluble movement of the spring end 14b with respect to the spring axis, this end 14b may be inserted into the aperture 15 of the hinge tube. The spring ends 14a and 14b may now be clipped short as shown, the pintle 13 inserted and headed over and the hinge is complete and practically indestructible.

To complete the oxford glasses, the usual latch members 17 and 18 may be used and the member 17 provided with the usual loop 19 for attaching a ribbon or chain.

Spectacles having temples or ear pieces such as 20 (Fig. 4) may also be provided with hinge mountings such as above described and in this event it is desirable to eliminate the latch members 17 and 18 but the temple hinges 21 may be provided with abutting edges 22 to retain the lenses in a superposed relation as shown.

Abutments 23 are provided on the bridge legs 5' to be engaged by the lenses to limit their outward movement relative to the bridge, but attempts to further move the lenses about their pivots will thus cause the bridge to flex sufficiently so that the glasses may be readily applied to and allowed to pinch the bridge of the nose.

While the drawing illustrates glasses having frames it is quite apparent that the present invention may be applied to any type of eye glasses, having frames or not.

From the foregoing it will be seen that a simple device for the purpose has been disclosed in the preferred form of its embodiment, but it is not desired to restrict the details to the exact construction shown, it being obvious that changes, not involving the exercise of invention, may be made without conflicting with the scope of the appended claim.

Having thus described my invention, what I claim as new and desire to secure by Letters Patent, is:

In an eyeglass mounting a pair of lens frames, a socketed projection on each frame, a torsional spring in each socket, one end of the spring being anchored in an angularly disposed aperture in the socket, a bridge flexible enough to permit application of the glasses to the nose of a wearer, a forked end on each leg of the bridge, said forked end fitting over one of said socketed projections and pivotedly connected thereto, one of the portions of each forked end being apertured to anchor the other end of its respective spring and a projecting abutment on each bridge leg positioned substantially midway between the midpoint of the leg and the spring hinge, said abutments being adapted to be contacted by cooperating portions of the respective lens frames to limit the outward movement of the lens frames relative to the bridge and whereby further outward movement of the lenses will flex the bridge so that the glasses may be readily applied to and allowed to pinch the bridge of the nose of a wearer.

ROSOLINO GULOTTA.